Sept. 19, 1967     E. FABBRI     3,342,306
CONVEYOR WITH TROUGHS OF VARIABLE DEPTH
Filed May 12, 1964     2 Sheets-Sheet 2
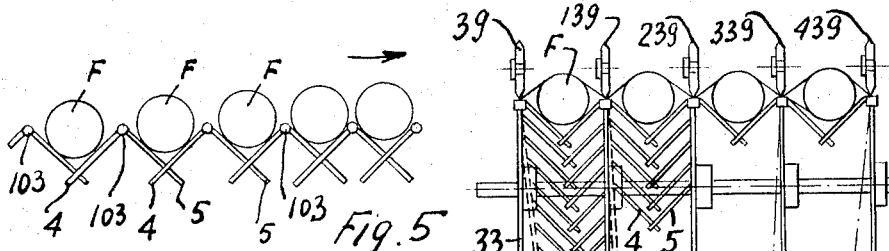
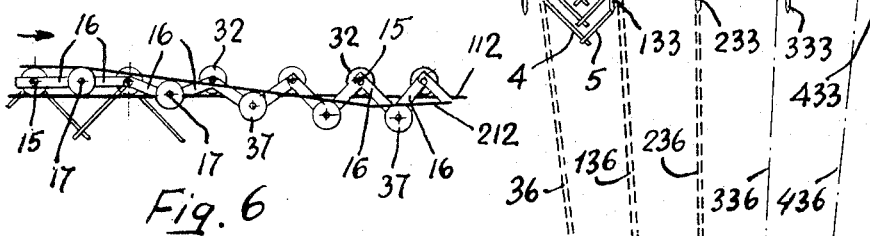
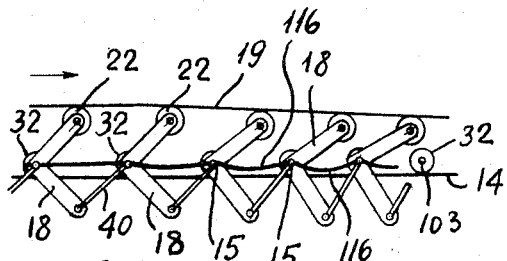
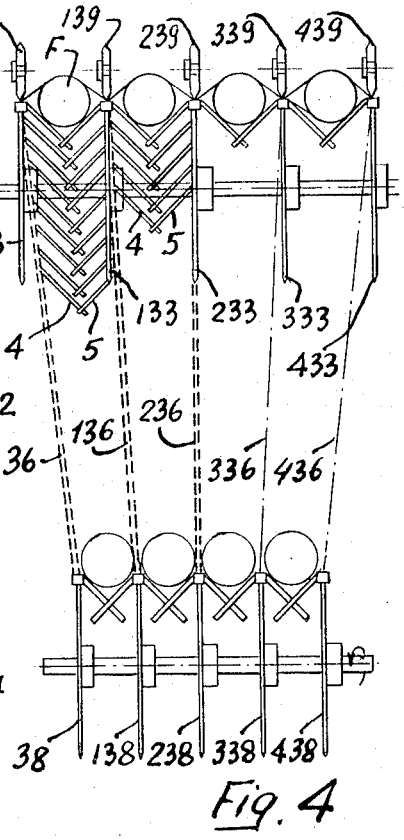
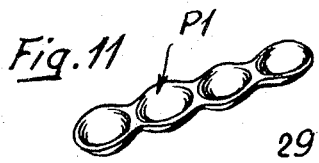
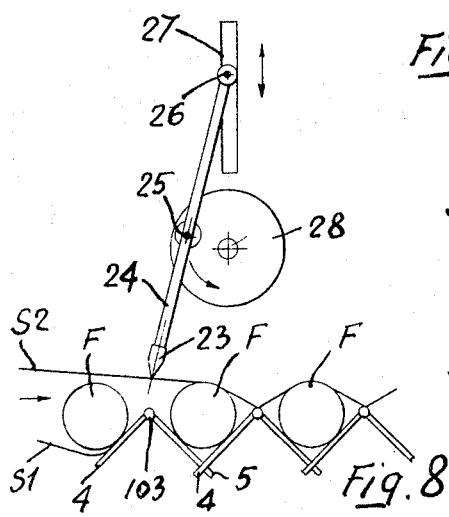
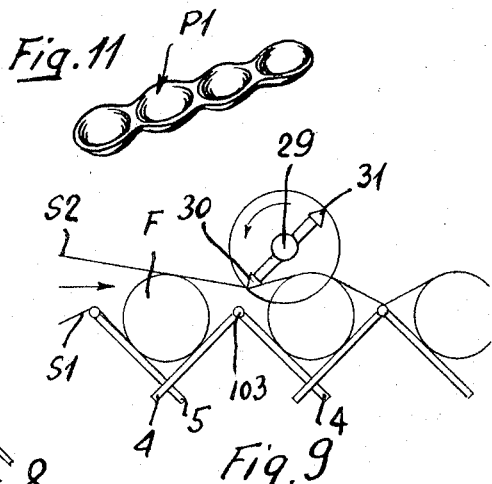

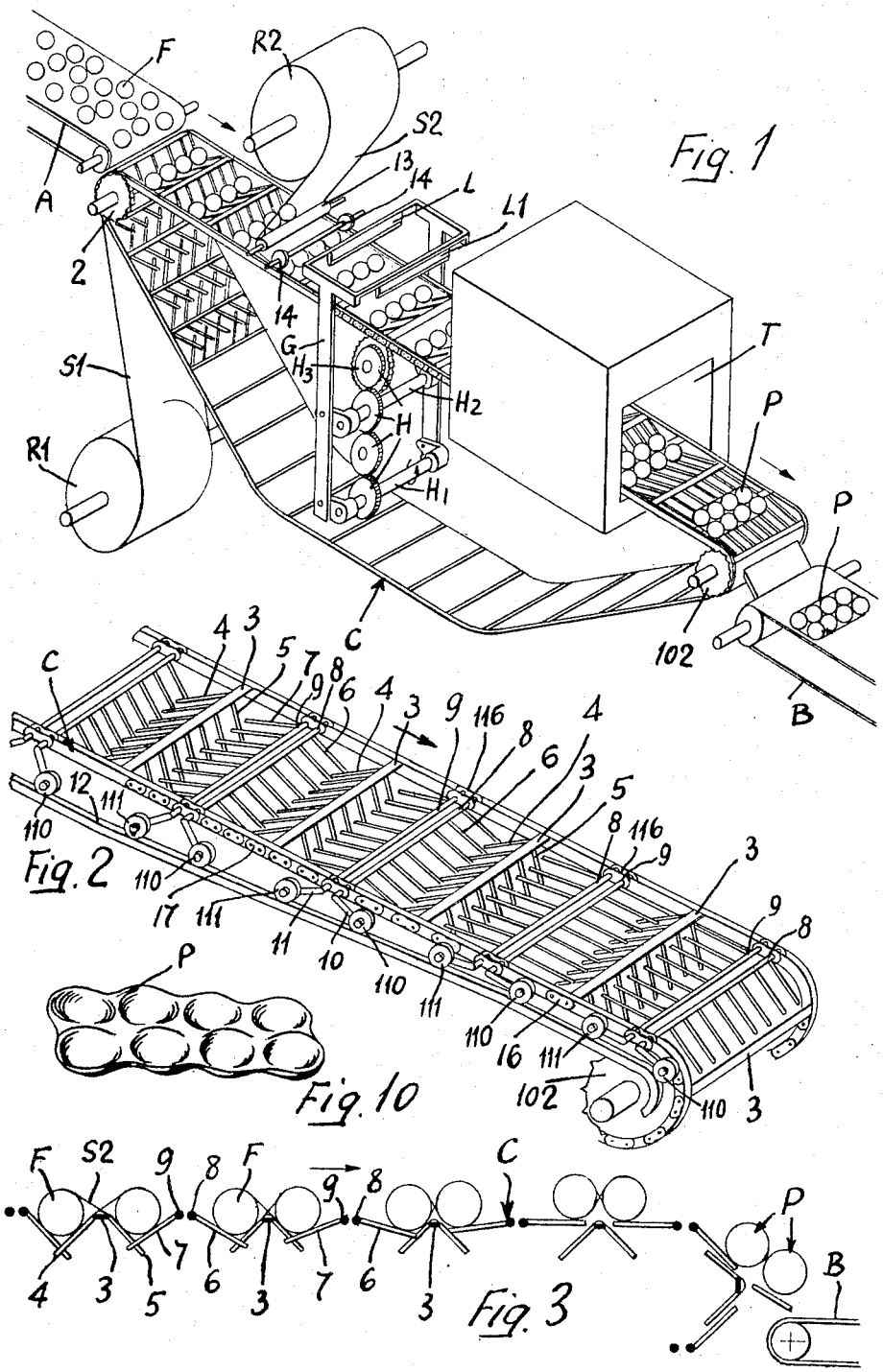

United States Patent Office 3,342,306
Patented Sept. 19, 1967

3,342,306
CONVEYOR WITH TROUGHS OF VARIABLE DEPTH
Ermanno Fabbri, 118 Via Caselline, Vignola, Italy
Filed May 12, 1964, Ser. No. 366,742
Claims priority, application Italy, Jan. 9, 1964, 706/64
7 Claims. (Cl. 198—40)

This invention relates generally to wrapping and packaging machines, and more particularly, to a wrapping and packaging machine employing an improved conveyor assembly and a novel control mechanism interconnecting the conveyor assembly with a heat sealing mechanism so as to accurately wrap and seal each article passing through the machine.

An object of this invention is to provide a machine for automatically wrapping articles, such as peaches, oranges, cup-cakes, and the like, between two sheets of shrinkable thermoplastic foil, and for subsequently heat sealing such sheets into a transparent, moisture-proof package.

Another object of this invention is to construct an endless chain conveyor with troughs or pockets formed therein, such pockets being deepest at the point where the articles to be packaged are introduced onto the conveyor, and such pockets being gradually reduced in depth as they approach the discharge point on the conveyor.

A further object is to construct a guide rail adjacent to the conveyor for coaction with crank arms mounted on the conveyor to control the gradual reduction in the depth of the troughs or pockets in the conveyor.

Still another object is to form troughs or pockets in the conveyor from pairs of pivotable members with rake-like teeth extending therefrom, the degree of overlapping of the teeth determining the depth of the trough.

Yet another object is to provide a conveyor with troughs that are gradually reduced in both depth and width as the conveyor is advanced.

Other objects and advantages of the invention will become apparent from the following specification of some embodiments of the invention, shown diagrammatically by way of example on the accompanying drawings, in which:

FIGURE 1 is a perspective view of one embodiment of the wrapping and packaging machine constructed in accordance with the principles of this invention, such machine being provided with transverse troughs extending laterally between a feed conveyor and a package discharging conveyor;

FIGURE 2 is a perspective view of part of the endless chain conveyor in FIGURE 1, such conveyor having a transversely undulating or trough-shaped supporting run;

FIGURE 3 is a diagrammatical side view of the endless conveyor shown in FIGURE 2 and showing the progressively decreasing depth of the troughs from the inlet to the outlet end of the conveyor;

FIGURE 4 is a plan view of an alternative embodiment of an endless conveyor, such conveyor having longitudinal troughs of decreasing width from the inlet to the outlet end of the conveyor; the rakes defining the troughs are shown diagrammatically in end elevation, i.e. rotated by 90°, solely for the purpose of illustration;

FIG. 5 is a diagrammatical side elevation of the troughs of another conveyor embodiment, such figure showing the progressive decrease in the depth of the troughs as the rods with the rake-like teeth that define the troughs progressively approach each other;

FIG. 6 shows in side elevation the mechanism for progressively decreasing the depth of the troughs of the conveyor of FIG. 5;

FIGURE 7 shows another mechanism for decreasing the distance between the rods with rake-like-teeth thereon;

FIGURES 8 and 9 show diagrammatically, in side elevation, two embodiments of devices for welding the top sheet upon the lower sheet of plastic material intermediate each pair of articles to be wrapped, and FIGURES 10 and 11 show two packages as they are formed by the machines shown in FIGURES 1 and 4, respectively.

Referring now to the drawings, FIGURE 1 shows diagrammatically a first conveyor A and a second conveyor B. Conveyor A transports the individual articles F to be wrapped and sealed, such as oranges or apples, to an inlet point for a packaging machine, and conveyor B transports articles F away from the discharge point for the machine in heat-shrunk packages P containing a plurality of such articles. The packaging machine, which is situated between conveyors A and B, includes an endless conveyor C. Conveyor C has an upper run that gradually slopes downwardly from its high point adjacent conveyor A to its low point adjacent conveyor B.

Conveyor C includes a pair of endless chains fabricated from a series of links 16 and 116, as shown in FIGURE 2. Links 16 are joined together in a conventional manner by pins 117, while links 116 are of somewhat modified design and are retained in place by rods 8 and 9 which protrude longitudinally beyond the chains. Such chains extend between pairs of sprocket wheels 2 and 102, the latter wheels being positively driven by a conventional prime mover (not shown).

A series of rigid bars 3 extend longitudinally between the pair of chains and a series of pivotable rods 8 and 9, is interspersed between bars 3 along the length of the chains. Bars 3 have two sets of rake-like teeth 4 and 5 fixed thereto. Each set of teeth extends away from an imaginary vertical plane passing through bar 3 at a 45° angle, thus forming a right angle between sets of teeth 4 and 5. Rods 8 and 9, which are mounted adjacent to one another, each have one set of rake-like teeth 6 and 7, respectively. As seen in FIGURES 2 and 3, the sets of teeth are longitudinally spaced from from one another by a slight distance so as to permit relative movement therebetween along the path of travel of conveyor C.

As noted above, rods 8 and 9 longitudinally protrude beyond the chains and terminate in perpendicularly extending crank arms 10 and 11, respectively, as seen in FIGURE 2. Each arm 10 has a roller 110 affixed thereto at each end and each arm 11 has a roller 111 affixed thereto at each end. These rollers roll upon pairs of guide rails 12 (only one rail being visible in FIGURE 2), such rails being situated adjacent to the upper run of the respective chains of conveyor C. Each rail 12 extends at an acute angle with respect to the upper run of each chain of conveyor C, the magnitude of such angle gradually diminishing as the rail slopes downwardly along its length from sprocket 2 to sprocket 102. The lower run of conveyor C is allowed to hang freely.

The above described structural configuration functions in the following manner. At the inlet end of conveyor C adjacent to sprocket wheel 2, crank arms 10 and 11 hang downwardly so that rollers 110 and 111 form an angle of almost 90° between themselves and each crank arm is positioned about 45° from the horizontal plane of the upper run of conveyor C. Since arms 10 and 11 are merely extension of rods 8 and 9, these rods assume the same angular orientation. Thus, sets rake-like teeth 6 and 7, respectively, cooperate with the fixed rake-like teeth 4 and 5 of rigid bar 3 to define a trough or pocket of maximum depth, such trough being illustrated at the left hand side of FIGURES 1–3. The deep trough is necessary to receive and seat the articles F to be packaged from conveyor A.

As conveyor C advances and the slope of rail 112 gradually decreases, rollers 110 and 111 ride along rail 112 and slowly rotate into almost horizontal attitude at sprocket 102, i.e., rollers 110 and 111 are spaced from each other by 180°. Accordingly, rods 8 and 9 slowly rotate until rake-like teeth 6 and 7, respectively, are parallel to the horizontal plane of the conveyor and the troughs in the conveyor now are very shallow. Such lessening of the depth of the troughs is necessary in order to readily release the package P of articles to discharge conveyor B. This process is illustrated diagrammatically in FIGURE 3.

The machine as shown in FIGURE 1, which is located between a feed conveyor A and a package-discharge conveyor B, also includes reels R1 and R2. R1 feeds continuous sheets or bands S1 of shrinkable thermoplastic material starting from the inlet end of the conveyor C, so as to cover or line the troughs formed by angularly intermeshing rake teeth. R2 feeds a second sheet or band of shrinkable thermoplastic material, from above the upper run of the conveyor C into a position past the feed position. A roller 13 is mounted transversely of the plane of the conveyor C so as to keep the plastic sheet S2 parallel to the plane of said conveyor and adjacent to the fruit or like articles fed into the troughs. A rod 14 is mounted on end rollers for further guiding the top sheet S2 above the plane of the conveyor C.

Spaced along conveyor C from rod 14 is a mechanism for welding the top sheet S2 to the bottom sheet S1 along the boundary line between two adjoining packages P. In the case under consideration, such packages are formed by two rows of fruit. Knife blades are provided for severing the packages along this welded line or strip, said means being conventional and forming no part of the invention. In the embodiment shown in FIGURE 1, these severing means are represented by a frame G, slidably mounted in vertical direction, and comprise two T-shaped frame members mounted by two sides of the conveyor C. The T-shaped frame members are connected together, under the conveyor C, by shafts H1 and H2 and are connected together above the conveyor C, by means of a rectangular frame. These shafts have end cranks for causing a reciprocal motion of the frame. The toothed wheels of gear train H are driven by the chains of the conveyor C, with which it is connected by means of sprocket wheel H3. Thus frame G is reciprocated in a vertical direction in timed relation with the movement of said conveyor C. The rectangular frame carries a pair of parallel severing blades L and L1 of known construction at its upper end.

A tunnel T is located past the reciprocating frame G. Within tunnel T, by means of hot air, infrared rays or other means, the shrinkable thermoplastic material enveloping a group of fruits is heated until the facing sheet sections between and beyond the fruits becomes very soft and becomes welded or joined together. At the same time, the sections separated by the fruits adhere thereto and thus form packages P such as those shown in FIGURE 10. Each package P is thus formed of two thermoplastic sheet sections welded together.

FIGURE 4 shows diagrammatically a plan view of another embodiment of a conveyor comprising a plurality (4, in the example as shown) of longitudinally extending troughs of decreasing depth and width, such troughs are formed within converging conveyor chains 36, 136, 236, 336, and 436 by the overlapping of inclined rake teeth 4 and 5 (shown turned by 90° from the orientation of FIGURES 1-3). Such teeth cross at a constant angle, but at a progressively decreasing depth, according to the distance between each pair of adjacent conveyor chains. The chains run upon sprocket wheel pairs 33–38, 133–138, 233–238, 333–338 and 433–438, respectively. The distance between the adjacent parallel wheels 33–133 is greater than the distance between corresponding wheels 38–138, the sprockets 38, 138, 238 and 438 being the driving wheels. The decrease in the depth of the troughs is proportional to the decrease in the width of the conveyor as the chains converge. Welding and cutting discs 39–439 may be provided in suitable positions so that the packages, after their passing through the heating tunnel (not shown) are heat shrunk to assume the form of package P1, seen in FIGURE 11.

FIG. 5 shows diagrammatically the manner in which supporting bars 103 gradually approach each other during the course of travel of the upper run of another embodiment of a novel conveyor, with troughs of variable depth. Rods 103 have sets of rake-like teeth 4 and 5 secured thereto, and teeth 4 and 5 are so positioned as to define a right angle therebetween. The leftwardly extending teeth 4 of a first rod 103 overlap the rightwardly extending teeth 5 of a second rod 103. The point of overlap of such teeth determines the depth of the trough which will carry the articles to be packaged, such as fruit F, along the conveyor.

In contrast to the embodiment of FIGS. 1-3, wherein the depth of the troughs was gradually diminished by the pivotal movement of rake-like teeth 6 and 7 with respect to fixed teeth 4 and 5, and in further contrast to the embodiment of FIG. 4, wherein the depth of the troughs was controlled by the convergence of the chains, fixed teeth 4 and 5 are brought closer together by decreasing the horizontal distance between successive rods 103. As the rods are brought closer together, teeth 4 and 5 will overlap at a higher point each time and thus progressively decrease.

FIGURE 7 shows another mechanism for decreasing the depth of the trough conveyor according to invention. Such mechanism has a pair of chain or of flexible belts, cords or the like 116. Pins 15 are attached the extensions of rods or bars 103, to which members the pairs of angularly arranged rake teeth are fastened. Furthermore, bell-crank levers 18 are fastened to the pins 15, and rollers 32 are provided on levers 18 so that the rollers move upon a guide rail 14. The bell-crank levers 18 are further provided at their top end or head with additional rollers 22 running under a guide rail 19, such rail converging towards rail 14 in the direction of travel of the trough conveyor. The tail ends of levers 18 are connected with the rollers 32 fitted on to the next-lying lever 18 by means of a connecting rod 40.

It is apparent that, with the conveyor running, rollers 22 abut against the inclined rail 19 and cause the levers 18 to progressively rotate in clockwise direction. By this movement the tail ends of the levers draw the connecting rods 40 so as to pull roll 32 of the next-lying lever nearer to roll 32 to the preceding lever 18, and promoting a bending of the chain or belt 116 between the levers 18, thus shortening the distance between the pins 15. As a consequence, the double rakes 4 and 5 are pivoted to provide the effect illustrated in FIGURE 5.

FIGURE 8 shows a device for welding, at predetermined intervals, the top sheet S2 to the bottom sheet S1, particularly in the embodiment shown in FIGURES 5 and 6. The welding device comprises a disc 28 and a bar 24, the bar being pivotally mounted eccentrically as at 25 upon the disc and carrying at one end thereof a heat sealing head 23. The other end 26 of bar 24 is provided with a roller rolling in a guide slot 27. Accordingly, as the disc 28 rotates, the welding point is lowered at equal intervals so as to press the sheet S2 upon the sheet S1 lying upon a bar 103.

FIGURE 9 shows another embodiment of welding and cutting heads 30 and 31. Such heads are fastened to the ends of a bar rotatably mounted on shaft 29, and the movement of the heads is so timed as to coact with the bars 103. The bars 103 provide a fixed surface to receive the downward forces exerted by the heads.

From the foregoing, it is apparent that a machine has been provided which is capable of automatically forming packages for middle-sized fruits or like articles. Such machine wraps each piece of fruit or article between two foils of shrinkable thermoplastic material and welds the foils all around each fruit or article. The packaging machine is further provided with means for severing a number of wrapped pieces into an attractively sealed plastic package.

I claim:
1. A conveyor adapted to transport fruit or similar articles, said conveyor comprising:
   a pair of endless chains,
   a plurality of spaced bar members extending longitudinally between said chains and being mounted therein,
   at least one set of rake-like teeth extending angularly from each of said bar members toward an adjacent bar member to define a plurality of troughs between said chains along a run of the chains,
   drive means for laterally advancing said chains,
   guide means positioned in operative relationship to said bar members, said guide means and such run of said endless chains being disposed at an acute angle relative to one another, and
   means connected to said bar members and coacting with said guide means to impart rotational forces to said bar members, whereby the troughs are progressively varied in depth during the advancing of the chains.

2. A conveyor as defined in claim 1 wherein said bar members further include extending portions that protrude longitudinally beyond said chains, lever means mounted upon said extending portions of the bar members, a first set of rollers affixed to said lever means, said rollers riding along said guide means so as to pivot said lever means.

3. A conveyor as defined in claim 2 wherein each of said lever means comprises a bell crank lever and a connecting rod, said lever being mounted at its midpoint upon said extending portion of the bar members, and said rod being secured to the midpoint of said lever and to one end of an adjacent lever to thereby shorten the spacing between adjacent bar members.

4. A conveyor as defined in claim 3 wherein said guide means comprises a pair of cam tracks located adjacent to a run of each of the endless chains, a first track in each of said pairs extending in a plane parallel to the run of said chains, and a second track sloping downwardly with respect to the plane of the first track, a second set of rollers secured to the extending portions of said bar members, said second set of rollers riding along said first track and said first set of rollers riding along said second track.

5. A conveyor as defined in claim 1 wherein said chains comprise a series of interconnected links, said bar members including extending portions that protrude longitudinally beyond said chains, one end of each of said links being secured to the extending portion of the bar members, a first set of rollers affixed to the other end of said links, said set of rollers riding along said guide means so as to pivot said links and thereby shorten the lateral spacing between adjacent bar members.

6. A conveyor as defined in claim 5 wherein said guide means comprises a pair of cam tracks located adjacent to a run of each of the endless chains, a first track in each of said pairs extending in a plane parallel to the run of said chains, and a second track sloping downwardly with respect to the plane of the first track, a second set of rollers secured to the extending portions of said bar members, said second set of rollers riding along said first track and said first set of rollers riding along said second track.

7. A conveyor as defined in claim 6 wherein said first and second set of rollers are longitudinally spaced from each other and are alternately located when viewed in a lateral plane.

References Cited
UNITED STATES PATENTS

| | | | |
|---|---|---|---|
| 2,486,759 | 11/1949 | Pfeiffer | 53—28 |
| 2,525,651 | 10/1950 | Clunan | 53—180 X |
| 2,637,959 | 5/1953 | Dreher | 53—180 |
| 2,695,483 | 11/1954 | Toews | 53—182 X |
| 2,737,764 | 3/1956 | Lewis | 53—180 X |
| 2,931,148 | 4/1960 | Smith | 53—28 |

FOREIGN PATENTS

| | | |
|---|---|---|
| 1,369,443 | 7/1964 | France. |

ANDRES H. NIELSEN, *Primary Examiner.*

EVON C. BLUNK, GRANVILLE Y. CUSTER, JR., RICHARD E. AEGERTER, *Examiners.*